UNITED STATES PATENT OFFICE.

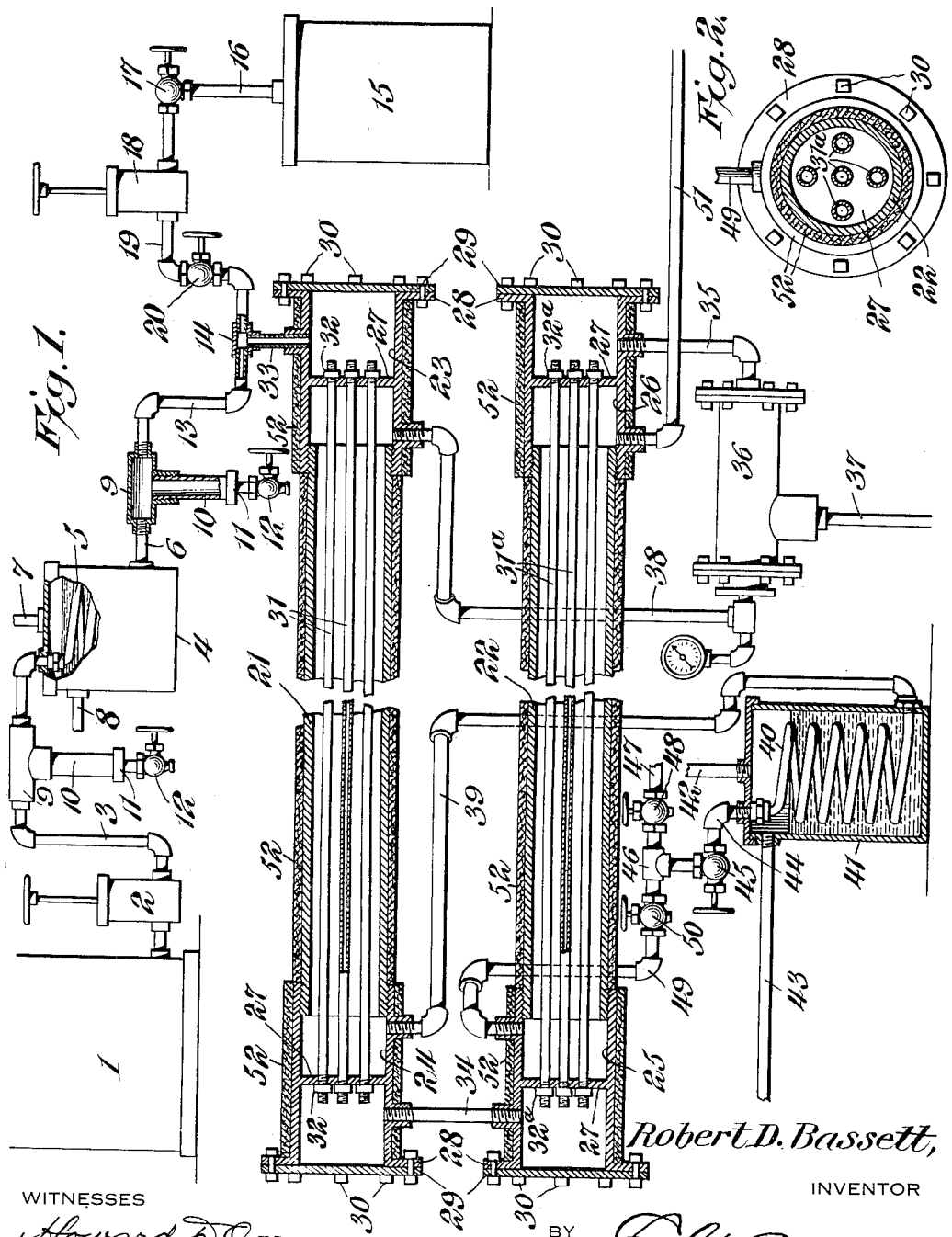

ROBERT D. BASSETT, OF KINZUA, PENNSYLVANIA, ASSIGNOR OF ONE-THIRD TO KARL A. KRANTZ, OF KINZUA, PENNSYLVANIA, AND ONE-THIRD TO HENRY H. BASSETT, OF GRAND VALLEY, PENNSYLVANIA.

APPARATUS FOR RECOVERING AND GRADING GASOLENE.

1,120,670.  Specification of Letters Patent.  Patented Dec. 15, 1914.

Application filed April 30, 1912. Serial No. 694,155.

*To all whom it may concern:*

Be it known that I, ROBERT D. BASSETT, a citizen of the United States, residing at Kinzua, in the county of Warren and State of Pennsylvania, have invented a new and useful Apparatus for Recovering and Grading Gasolene, of which the following is a specification.

This invention has reference to improvements in apparatus for recovering and grading gasolene, and its object is to produce a means whereby gasolene of any desired degree of specific gravity may be produced without the necessity of resorting to wasteful methods such as are at present employed, especially when it is desired to produce a gasolene of lower degree from a high degree gasolene, or from the gas from which such high degree gasolene may be produced.

The great inflammability of high degree gasolene, because of its highly volatile nature, and the consequent danger to life and property in handling such gasolene has caused railroads and other common carriers to adopt regulations with respect to the degree of specific gravity of the gasolene to be accepted for transportation. Many common carriers refuse to transport gasolene which is higher than seventy-eight or eighty degrees specific gravity Baumé, wherefore the shipper must reduce his high degree gasolene, say of ninety-one degrees, to seventy-eight or eighty degrees, and this has generally been done by permitting a portion of the gasolene to evaporate, thus entailing considerable waste which is obviated by the present invention.

In accordance with this invention a gasolene of the desired degree specific gravity is produced by mixing high degree gasolene and the gas from which it is taken, or the gas before the high degree gasolene is taken therefrom, with low degree gasolene in proportions to produce the desired degree, while at the same time a greater amount of gasolene has been recovered than has heretofore been the case.

The invention will be best understood from a consideration of the following detailed description, taken in connection with the accompanying drawings forming a part of this specification, with the understanding that while in the drawings there is shown an arrangement whereby the invention may be practised, it is susceptible of other embodiments than the one shown and consequently the invention is not confined to any strict conformity with the arrangement illustrated in the drawings, but may be variously modified so long as the changes do not mark any material departure from the salient features of the invention.

In the drawings:—Figure 1 is a diagram, with some parts in elevation, indicating an apparatus constructed in accordance with the present invention. Fig. 2 is a cross section of one of the elongated mixing and condensing devices.

In the drawings there is shown a reservoir 1, which may be assumed to be of suitable capacity, and which is to be taken as indicative of any suitable source, whether a well or a tank, of gas productive of high degree gasolene. In the subsequent treatment the gas, and the high degree gasolene when present, are under considerable pressure, say, about one hundred and forty pounds per square inch, and this pressure may be either natural pressure or may be produced artificially, and is typified in the drawings by a pump 2 connected to the reservoir or tank 1, and from the pump the compressed gas passes by a pipe 3 through a drip device to be presently described, and thence into a cooling device 4 when it is desired to first condense high degree gasolene from the gas. The cooling device may consist of a simple casing inclosing a coil 5 connected at one end to the pipe 3, and at the other end to another pipe 6. A cooling medium, such as water, may enter the casing 4 through a pipe 7 and escape by way of a pipe 8, the parts being more or less typical of any suitable apparatus for the purpose. Before reaching the cooler 4 when the latter is included in the system, and after passing from such cooler, the gas from which the high degree gasolene is made, or both the high degree gasolene and the gas pass through a drip device comprising an elongated casing 9 having at an itermediate point a bottom extension 10 terminating in a reducing coupling 11 to which is connected a valve 12.

The drip device is valuable in the pipe 3 in taking out certain impurities when they condense, and the drip device in the pipe 6 is valuable in removing certain impurities which condense on passing through the cooling device 4. Leading from the second drip device into which the pipe 6 discharges is another pipe 13 terminating at a T coupling 14. There is also indicated a tank or reservoir 15 which may be taken as typical of any suitable supply of low degree gosolene or high degree kerosene, and while reference will hereinafter be made particularly to low degree gasolene, it will be understood without further explanation that under some circumstances high degree kerosene may be employed in place of low degree gasolene.

The reservoir 15 is connected by a pipe 16 through a valve 17 to a pump 18, and the latter is connected by a pipe 19 through a valve 20 to the T 14. The pump 18 is to be taken as typical of any suitable means for supplying the low degree gasolene to the T 14 under appropriate pressure, and the quantity of low degree gasolene supplied in any unit of time is controllable by the valves 17 and 20, the latter serving to wholly cut off communication between the pump 18 and the T 14 when desired. There are also provided two elongated casing 21 and 22. The casing 21 is screwed at the ends into hollow heads 23, 24, respectively, and the casing 22 is screwed at the ends into other hollow heads 25, 26, respectively, the several heads being substantially alike and each provided with an intermediate diaphragm or division wall 27. The end of each head remote from that into which the respective casing 21 or 22 is screwed is formed with a circumferential flange 28 designed to receive a cap plate 29 held in place by bolts 30. It will be understood that with respect to the parts already described and with respect to those to be described suitable provision is made for packing or otherwise preventing leakage, but it is not deemed necessary to either show or describe any means for such purpose.

Each diaphragm or division wall 27 of the heads 23 and 24 is traversed by a suitable number of passages through which extend the corresponding ends of pipes 31, these pipes being held in place by nuts 32 and each pipe opens into a chamber formed between the diaphragms 27, and the cap 29. Each diaphragm or division wall 27 of the heads 25 and 26 is traversed by a suitable number of passages through which extend the corresponding ends of pipes 31ª held in place by nuts 32ª, and each pipe opens into a chamber formed between the respective diaphragms 27 and cap 29 of the heads 25 and 26. There is no communication between the interior of the casing 21 or 22 and the terminal chambers in the heads at the ends of the casings formed between the diaphragms 27 and the caps 29, but the chamber in the head at one end of each casing 21 or 22 is in constant communication with the like chamber in the head at the other end thereof through the pipes 31 and 31ª respectively, said pipes being grouped in spaced relation one to the other and to the walls of the respective casing through which they pass.

The T 14 is connected with the interior of the terminal chamber within the head 23 by a pipe 33. The terminal chamber within the head 24 is connected to the like terminal chamber within the head 25 by a pipe 34 and leading from the terminal chamber within the head 26 is a pipe 35 entering one end of a separator 36 designed to separate liquid gasolene from the gas accompanying it; and since this separator is of known construction it is neither shown nor described in detail. The liquid gasolene leaves the separator by a pipe 37, while the lean gas leaves the separator by a pipe 38, which in turn is connected with the head 33 on the side of the diaphragm 27 therein remote from the cap 29, so that gas from the pipe 38 will flow into and through the casing 21 about the pipes 31 to the head 24, whence the gas passes out of the casing by way of the pipe 39 leading to the coil 40 within a casing 41 similar to the coil 5 within the casing 4. The casing 41 may receive a heating medium through a pipe 42, and such heating medium after performing its function may escape by way of the pipe 43. The gas in its passage through certain valves becomes chilled by expansion, and, therefore, the heating coil 40 is employed to prevent freezing of such valves through which the gas is subsequently conducted. That end of the coil 40 remote from the pipe 39 is connected to a pipe 44 including a valve 45, and the pipe 44 terminates in a T 46 from one side of which there is branched a pipe 47 including a valve 48, and from the other side of which there is branched a pipe 49 including a valve 50. The pipe 49 is connected with the interior of the head 25 on the side of the diaphragm 27 remote from the cap 29, so that gas entering the head 25 by way of the pipe 49 has free access to the interior of the casing 22 about the pipes 31ª therein. Leading from the head 26 at that end communicating with the casing 22 is a pipe 51.

High degree gasolene, together with the gas out of which it is made, or the rich gas before high degree gasolene has been condensed, flows at a pressure of from one hundred and twenty to one hundred and forty pounds although not confined to any exact amount, into the chamber within the head 23 between the diaphragm 27 and cap 29. The low degree gasolene is forced through the pipe 19 to the pipe 33 and by way of the latter into the same chamber within the head 23 as the high degree gasolene or gas, where the two grades of gasolene or the gas and low degree gasolene, as the case may be, become mixed, wherefore the chamber in question may be termed a mixing chamber. The mixture then passes through the pipes 31, traversing the casing 21 until the terminal chamber in the head 24 is reached, and thence by the pipe 34 into the terminal chamber of the head 25, and then through the pipes 31ᵃ traversing the casing 22 into the terminal chamber of the head 26, ultimately passing therefrom by the pipe 35 into the separator 36. The lean gas entering the pipe 38 passes into the interior of the casing 21 under about the ordinary pressure of one hundred and twenty to one hundred and forty pounds. The high degree gasolene and gas, or the rich gas alone, has, therefore, an opportunity to become thoroughly intermixed with a low degree gasolene in passing through the pipes 31 of the casing 21. It is found advisable to somewhat warm the gas from the pipe 39 before reaching the valve 45, wherefore the heating coil 40 is provided, for otherwise there is a liability of having the valve 45 freeze. The gas on entering the casing 22 may still further expand, thus absorbing a great amount of heat and correspondingly cooling the pipes 31ᵃ traversing the casing 22, thereby cooling the gas and gasolene flowing through these pipes to a very low degree, wherefore a material amount of gasolene is condensed from the gas passing through these pipes even though high degree gasolene had previously been condensed from the same gas. Such lean gas as is not needed for cooling purposes may pass by way of the valve 48 into the pipe 47 and thence to a suitable point of disposal, and the gas which has traversed the casing 22 may likewise be carried by the pipe 51 to a suitable point of disposal.

Whatever be the desired degree of specific gravity of the gasolene to be produced it is readily brought about with the apparatus of the present invention by mixing high and low degree gasolene with such gas as may accompany the high degree gasolene, or mixing the rich gas before deposition of the high degree gasolene with low degree gasolene under compression, and subjecting the mixture to chilling due to the expansion of the lean gas allowed to flow in chilling relation of the mixture, so as to cause the condensation of gasolene from the rich or partially depleted gas, thus bringing about a material increase over the quantity of gasolene heretofore obtained, while the degree of specific gravity of the resultant gasolene is readily controllable.

With the apparatus of the present invention it is feasible to produce any grade of gasolene desired without waste of material and with a natural increase in the amount of liquid gasolene obtained, since some of the gas heretofore allowed to escape is converted into gasolene. Moreover, existing supplies of high degree gasolene need not be evaporated to a considerable extent in order to lower the grade to the degree necessary for its acceptance by the common carriers, for by the present invention the high degree gasolene may be reduced to commercial standards. By the apparatus of the present invention the grade of low degree gasolene may be raised.

It is customary to make the casings 21 and 22 cylindrical and to prevent exchange of heat between the interior and the exterior of the casings they may be provided with thermo-insulating coverings 52 and the pipes where necessary may be likewise covered, but as this is a common practice it is deemed unnecessary to further illustrate the coverings than by the indications of Figs. 1 and 2.

While but two cylinders or casings 21 and 22 have been shown, it will be understood, of course, that the invention is not limited to two cylinders, but more may be used by properly balancing the structure in coupling or connecting them, and it may be stated that practice has demonstrated that two casings or cylinders at least are necessary, that the high and low degree gasolenes or the low degree gasolene and the rich gas may be given a chance to mix in one of the cylinders at substantially normal temperature before the mixture is condensed, by exposing it to extreme cold in the other casing or cylinder. By the employment of high pressure lean gas around the pipes in the first cylinder, the temperature of the high degree gasolene and gas and of the low degree gasolene traveling through these pipes is maintained at a comparatively moderate degree, so that the two gasolenes and the gas simultaneously traveling through the pipes have time to become intimately mixed before being subjected to the action of the low temperature produced by the expansion of the lean gas in the second cylinder in order. Actual practice has demonstrated that the intimate mixture must be brought about before the deposition of the gasolene still in gaseous form, for otherwise there is a marked reduction in the amount of gasolene obtained when the thorough intermixture in the manner stated is not produced. From actual experience it has been found that with the apparatus of the present invention a given quantity of gas will produce approximately twice as much gasolene as has heretofore been produced.

The low degree gasolene is preferably forced into the high degree gasolene or the rich gas in the form of a spray, thereby producing a more intimate mixture and absorbing more or less of the gas not already taken up or condensed into high degree gasolene, and the product is, of course, of a degree of specific gravity due to the quantities of high degree gasolene or rich gas and low degree gasolene employed. Where the desired grade of gasolene is produced by evaporation the loss is often as much as one-fifth of the volume, while by the present invention not only is such hitherto waste material retained, but the actual quantity of gasolene obtained is increased, and, moreover, the degree of specific gravity of the resultant gasolene is different from that which would represent the average of the mixture of the two grades of gasolene.

What is claimed is:—

1. In an apparatus for recovering and grading gasolene, a plurality of connected casings in series having means at one end for the introduction of a plurality of grades of gasolene and the gas from which one of the grades of gasolene was produced, means at the end of the series of connected casings for separating resultant gasolene from the lean gas, means for directing the lean gas under pressure into temperature maintaining relation to the gasolene and gas during the first portion of their travel through the casings, and means for directing the lean gas in the expanded state in temperature reducing relation to the gasolene and gas during a subsequent portion of their travel through the casings.

2. In an apparatus for recovering and grading gasolene, a plurality of connected casings each having conduits therethrough, means for introducing gasolenes of different grades under pressure into the casings and directing them through the conduits, means for directing lean gas, from which gasolene has been removed, under pressure into the first of the series of casings to maintain the temperature of the gasolenes at a relatively high point during the first part of their travel through the series of casings, and means for causing the expansion of the lean gas about the conduits through which the gasolenes are passing during a subsequent portion of their travel to subject the gasolenes to very low temperature.

3. An apparatus for recovering and grading gasolene comprising a plurality of elongated casings each having end chambers and connecting pipes between them, connections between the end chamber of one casing and the corresponding end chamber of the next casing in order, means communicating with the end chamber of the first of the casings in order remote from that connected to the next casing in order for introducing different grades of gasolene simultaneously and under pressure, means for directing lean gas under pressure and corresponding temperature into the first of the series of casings about the pipes connecting the end chambers of said casing, means for directing the lean gas under pressure to the next casing in order about the pipes connecting the end chambers thereof, said last-named means including a pressure reducing valve for causing an expansion of the gas and a corresponding reduction in temperature on entering the second casing, and means at the end of the series of casings for separating the resultant gasolene from the lean gas and directing such lean gas to the first casing in order.

4. In an apparatus for recovering and grading gasolene, two elongated casings each having end chambers and connecting means between the chambers extending through the intermediate portion of the casing without communication therewith, one end chamber of one casing being connected to a corresponding end chamber of the other casing, means for introducing into the other end of the first casing high degree gasolene and the gas from which it is produced and also low degree gasolene all under pressure to form a mixture, a separator for removing the gasolene from the gas after escape from the second-named casing, a connection between the separator and the intermediate portion of the first-named casing for directing lean gas thereto at the pressure of separation, and controllable means between the intermediate portions of the two casings for directing lean gas from the first-named casing to the second-named casing under greatly reduced pressure and correspondingly reduced temperature.

5. In apparatus for recovering and grading gasolene, two elongated casings each having end chambers and connecting means between the chambers extending toward the intermediate portion of the casing without communication therewith, connecting means between corresponding end chambers of the two casings, means for supplying high degree gasolene and gas from which it is produced to the unconnected end of one of the casings, said supplying means including means for cooling the high grade gas and gasolene, means for introducing low grade gasolene into the said end of the casing simultaneously with the high grade gasolene, a separator connected to the unconnected end of the second casing for separating resultant gasolene from the lean gas, connections between the separator and the intermediate portion of the first casing for delivering lean gas thereto under the pressure of separation, and connections between the intermediate portions of the two casings including a reducing valve for delivering lean gas to the intermediate portion of the second casing from the like portion of the first casing at a greatly reduced pressure and corresponding reduced temperature.

6. In an apparatus for recovering and grading gasolene, an elongated casing having end chambers and connecting means between the chambers extending through the intermediate portion of the casing without communication therewith, another casing like the first named casing having one end chamber connected to a like end chamber of the first named casing, means for introducing into the other end of the first-named casing high degree gasolene and the gas from which it is produced, and also low degree gasolene to form a mixture, a separator for removing the gasolene from the gas after escape from the second-named casing, a connection between the separator and the intermediate portion of the first-named casing for directing lean gas thereinto at the pressure of separation, and controllable means between the first named casing and the intermediate portion of the second named casing for directing lean gas from the first-named casing to the second-named casing and allowing the gas to expand in the second named casing to chill the same, said last-named gas controllable directing means having warming means included therein.

7. An apparatus for recovering and grading gasolene comprising a drip device in the path of gasolene producing gas coming from a supply thereof under pressure, a cooling means connected to said drip device, another drip device connected to the cooling means, an elongated casing having connected end chambers and an intermediate portion without connection with the end chambers, connections between the second-named drip device and one end chamber of the casing, means for the introduction of low degree gasolene into one end chamber of the casing along with the high degree gasolene and the gas from which it is produced, another chambered casing having the chambers connected with an intermediate portion through which the connections extend without communication therewith with one end chamber connected to the first-named casing at the end thereof remote from that receiving the gasolenes, a separator connected to the second-named casing at the end thereof remote from that connected with the first-named casing, a connection between the separator and the intermediate portion of the first-named casing for the conducting of lean gas thereto at the pressure of separation, a connection between the intermediate portion of the first-named casing and the intermediate portion of the second-named casing including a warming means and controlling means, and means for the escape of lean gas from the second named casing.

In testimony, that I claim the foregoing as my own, I have hereto affixed my signature in the presence of two witnesses.

ROBERT D. BASSETT.

Witnesses:
RALPH MARSH,
J. W. GREEN.